United States Patent
Doron et al.

(10) Patent No.: US 12,225,856 B2
(45) Date of Patent: Feb. 18, 2025

(54) WRAPPING MATERIAL FOR REDUCED CONTAMINATION

(71) Applicant: Tama Group, Kibbutz Mishmar Ha'emek (IL)

(72) Inventors: Nachem Doron, Kibbutz Mishmar Ha'emek (IL); Gali Cantor Peled, Kibbutz Mishmar Ha'emek (IL); Erez Shani, Kibbutz Ramot Menashe (IL)

(73) Assignee: Tama Group, Kibbutz Mishmar Ha'emek (IL)

( * ) Notice: Subject to any disclaimer, the term of this patent is extended or adjusted under 35 U.S.C. 154(b) by 923 days.

(21) Appl. No.: 17/093,793

(22) Filed: Nov. 10, 2020

(65) Prior Publication Data

US 2022/0142053 A1    May 12, 2022

(51) Int. Cl.
*A01F 15/07*    (2006.01)

(52) U.S. Cl.
CPC .... *A01F 15/071* (2013.01); *A01F 2015/0745* (2013.01); *B32B 2405/00* (2013.01); *B32B 2410/00* (2013.01)

(58) Field of Classification Search
CPC ......................... A01F 15/071; A01F 2015/075
USPC ....................... 206/442, 390, 411; 428/195.1
See application file for complete search history.

(56) References Cited

U.S. PATENT DOCUMENTS

| | | | |
|---|---|---|---|
| 4,562,102 A * | 12/1985 | Rabuse | C09J 7/20 412/8 |
| 4,569,439 A * | 2/1986 | Freye | D04B 21/12 53/118 |
| 5,408,803 A * | 4/1995 | Weder | B29C 61/02 53/399 |
| 6,644,498 B1 * | 11/2003 | Lemberger | A47G 21/16 221/33 |
| 6,756,102 B1 * | 6/2004 | Galo | C09J 7/20 428/194 |
| 6,787,209 B2 | 9/2004 | Mass et al. | |
| 7,541,080 B2 | 6/2009 | Mass et al. | |
| 7,636,987 B2 * | 12/2009 | Derscheid | A01F 25/14 24/442 |
| 10,264,732 B2 | 4/2019 | Porter et al. | |
| 2006/0003129 A1 * | 1/2006 | Thiele | C09J 7/20 428/40.1 |
| 2009/0274881 A1 * | 11/2009 | Mass | C09J 7/38 428/195.1 |

(Continued)

FOREIGN PATENT DOCUMENTS

| | | |
|---|---|---|
| CN | 102015459 A | 4/2011 |
| WO | 2009/133422 A2 | 11/2009 |

*Primary Examiner* — Jacob K Ackun
(74) *Attorney, Agent, or Firm* — Foley & Lardner LLP

(57) ABSTRACT

In one embodiment, a wrapping material for wrapping around an agricultural product to form a bale, including a continuous web of material including a plurality of wrapping units, each wrapping unit having a first surface and an opposing second surface, and extending lengthwise from a leading end to a tail end, the tail end of each wrapping unit terminating at the leading end of an adjacent wrapping unit. Each wrapping unit includes a nontacky portion extending lengthwise from the leading end of the wrapping unit, and having a length greater than a circumference of the bale, and a tacky portion extending lengthwise from the nontacky portion to the tail end of the wrapping unit, and having a length greater than the circumference of the bale.

21 Claims, 7 Drawing Sheets

(56) References Cited

U.S. PATENT DOCUMENTS

2012/0148783 A1* 6/2012 Kunkleman ............ B62B 5/069
 428/43
2013/0032046 A1* 2/2013 Ohrn ....................... B29C 55/06
 264/165
2016/0151994 A1* 6/2016 Castillo ................... B32B 37/12
 428/41.8

* cited by examiner

WRAPPING MATERIAL FOR REDUCED CONTAMINATION

BACKGROUND OF THE INVENTION

Baling agricultural produce is a well-known and frequently used practice throughout the world. Various methods, techniques, products, materials and equipment have been used to harvest, bale and wrap agricultural produce. In recent years, knitted nets and films have been replacing the wire/sisal twine and baling twine which have been traditionally used. These nets and films are commonly constructed of polypropylene/polyethylene.

Some recent wrapping materials have included a tacky film for wrapping baled items, such as agricultural produce. Tacky films have the advantage of maintaining a seal of the wrapping material around the baled item. However, the tacky films can have the drawback of adhering to the agricultural product itself. This issue is particularly troublesome when the baled agricultural product is cotton or hay, and can increase the risk of pieces of the wrapping material becoming mixed in and processed with the agricultural product if the wrapping material is not carefully separated from the agricultural product during the unwrapping process. Pieces of wrapping material becoming mixed in with the cotton is known to significantly devalue the cotton. For example, cotton including extraneous plastics, such as those meeting U.S. Department of Agriculture Cotton & Tobacco Program classification codes 71 or 72, can lose more than half its value, resulting in losses of hundreds of dollars per bale. In some circumstances, the cotton may be contaminated so much that it loses its entire value, resulting in even greater losses. Furthermore, a greater frequency of failure during unwrapping would lead to more contaminated bales, which in turn may lead a grower or supplier to have a reputation of producing or supplying lower value cotton. Such a reputation can lead to even cotton batches not known to be contaminated being purchased for lower values, which can result in even greater losses for the grower or supplier.

It is therefore desirable to mitigate the overall risk of failure during the process of unwrapping a bale, such that plastic contaminants become mixed in with fewer bales on average. Failure during the unwrapping process may be characterized in terms of one or more pieces of the wrapping material becoming mixed in with the agricultural product during the unwrapping process and thus contaminating the agricultural product during later processing steps.

BRIEF SUMMARY OF THE INVENTION

The present disclosure relates to a wrapping material for wrapping a bale of agricultural material that separates from the agricultural product in a single piece when unwrapped from the bale. Unwrapping in a single piece avoids small pieces of the wrapping material becoming mixed in with and contaminating the agricultural product. This, in turn, mitigates the risk of failure during the bale unwrapping process, which in turn can reduce an overall level of contamination in the processed agricultural product.

One aspect of the present disclosure is directed to a wrapping material for wrapping around an agricultural product to form a bale, the wrapping material including: a continuous web of material including a plurality of wrapping units, each wrapping unit having a first surface and an opposing second surface, and extending lengthwise from a leading end to a tail end, the tail end of each wrapping unit terminating at the leading end of an adjacent wrapping unit, each wrapping unit including: a nontacky portion extending lengthwise from the leading end of the wrapping unit, and having a length greater than a circumference of the bale, and a tacky portion extending lengthwise from the nontacky portion to the tail end of the wrapping unit, and having a length greater than the circumference of the bale.

In some examples, the first surface of the tacky portion may be tacky, and both the first and second surfaces of the nontacky portion and the second surface of the tacky portion may be nontacky.

In some examples, the length of the nontacky portion may be more than 100% of the circumference of the bale, such that the nontacky portion overlaps the leading end of the wrapping unit when wrapped around the agricultural product. The length of the nontacky portion may be less than 115% of the circumference of the bale. The length of the nontacky portion may be approximately 7 meters. The nontacky portion may be configured to overlap itself along approximately 0.4 meters of the circumference of the bale when wrapped around the agricultural product. The length of the tacky portion may be about 200% of the circumference of the bale. The length of the tacky portion may be more than 200% of the circumference of the bale, such that the tacky portion overlaps itself along an entire circumference of the bale when wrapped around the agricultural product. The length of the tacky portion is approximately 14 meters.

In some examples, the first surface of the nontacky portion may be nontacky and configured to avoid adhering to the agricultural product, and the first surface of the tacky portion may be tacky and configured to adhere to the second surface of the wrapping unit. The tacky portion may have sufficient tackiness to maintain adhesion between the first surface of the tacky portion and the second surface of the wrapping unit when the wrapping unit is cut in a widthwise direction, such that the wrapping unit separates from the agricultural product in a single piece. The nontacky portion may have sufficient nontackiness to avoid adhesion between the first surface of the nontacky portion the agricultural product when the wrapping unit is cut in a widthwise direction and separates from the agricultural product. The agricultural product may be cotton.

In some examples, the second surface of the wrapping unit may be nontacky at both the tacky and nontacky portions.

In some examples, overlapping portions along the length of the nontacky portion may be configured to overlap one another when wrapped around the agricultural product, and the wrapping material may further include an indicator positioned at a predetermined location on the second surface of the tacky portion. The predetermined location may be a location that does not overlap the overlapping portions of the nontacky portion when wrapped around the agricultural product.

In some examples, overlapping portions along the length of the nontacky portion may be configured to overlap one another when wrapped around the agricultural product. The wrapping material may further include an indicator positioned at a predetermined location on the second surface of the tacky portion. The predetermined location may be a location that overlaps the overlapping portions of the nontacky portion when wrapped around the agricultural product.

In some examples, at least a portion of the nontacky portion may increase from a first width to a second width along a lengthwise direction of the wrapping unit, and at least a portion of the tacky portion may decrease from the second width to the first width along the lengthwise direction of the wrapping unit.

Another aspect of the present disclosure is directed to a method of wrapping a wrapping material around an agricultural product to form a bale, the method including: aligning a width of the wrapping material with a width of the bale; winding a wrapping unit of the wrapping material around a circumference of the bale, the wrapping unit having a first surface and an opposing second surface, and extending lengthwise from a leading end to a tail end, the tail end of the wrapping unit terminating at the leading end of a next wrapping unit of the wrapping material, the wrapping unit including each of a nontacky portion extending lengthwise from the leading end of the wrapping unit and a tacky portion extending length wise from the nontacky portion to the tail end of the wrapping unit. Winding the wrapping unit may include winding the nontacky portion of the wrapping unit around the bale for a length greater than a circumference of the bale, and winding a tacky portion of the wrapping unit around the bale and over the nontacky portion for a length greater than the circumference of the bale.

In some examples, the nontacky portion of the wrapping unit may be wound for a length that is less than 115% of the circumference of the bale. In some examples, the tacky portion of the wrapping unit may be wound for a length that is about twice the circumference of the bale. In some examples, the tacky portion of the wrapping unit may be wound for a length that is more than twice the circumference of the bale.

Yet another aspect of the present disclosure is directed to a method of unwrapping a wrapping material from around a bale of agricultural product, the wrapping material including (i) a nontacky portion wound around the bale for a length greater than a circumference of the bale and having a nontacky inner surface, and (ii) a tacky portion wound around the bale and over the nontacky portion for a length about twice the circumference of the bale and having a tacky inner surface. The method may include: cutting the wrapping material along an entire width of the wrapping unit; and separating the wrapping material from the agricultural product in a single piece. The nontacky inner surface of the nontacky portion may be configured to avoid adhering to the agricultural product during the separation of the wrapping material from the agricultural product. The tacky inner surface of the tacky portion may be configured to adhere to an outer surface of the wrapping material during the separation of the wrapping material from the agricultural product.

Cutting the wrapping material may include cutting along an indicator positioned at a predetermined location of the wrapping material and visible on an exterior of the bale. The predetermined location may be circumferentially located on the bale to not overlap with overlapping ends of the nontacky portion when wrapped around the agricultural product.

In some examples, cutting the wrapping material may include cutting away from an indicator positioned at a predetermined location of the wrapping material and visible on an exterior of the bale. The predetermined location may be circumferentially located on the bale to overlap with overlapping ends of the nontacky portion when wrapped around the agricultural product.

Yet a further aspect of the present disclosure is directed to a wrapped bale of agricultural product comprising agricultural product and a wrapping material wrapped around the agricultural product to form a bale, the wrapping material including a first surface and an opposing second surface, and extending lengthwise from a leading end to a tail end, the tail end of each wrapping unit terminating at the leading end of an adjacent wrapping unit, the wrapping unit further including: a nontacky portion wrapped fully around a circumference of the bale, wherein the first surface of the nontacky portion is in direct contact with the agricultural product, and a tacky portion wrapped fully around the circumference of the bale by approximately two revolutions. The first surface of a first sub-portion of the tacky portion may be in direct contact with and adhered to the second surface of the non-tacky portion, and the first surface of a second sub-portion of the tacky portion may be in direct contact with and adhered to the second surface of the first sub-portion of the tacky portion. In some examples, a circumference of the bale may be between 6-7 meters.

DETAILED DESCRIPTION

When referring to specific orientations, dimensions, or compositions of elements in the following disclosure, it should be understood that both the precise quantity or example given and functionally equivalent values are contemplated. For example, if a compound is stated to be 90% of a given element or composition, near equal compositions being, for example, 88% to 92% that same compound are contemplated. The range of such approximations should be considered to encompass all nearby values that a skilled person would understand to perform in a substantially equivalent manner to the specific value stated.

Figure 1A:
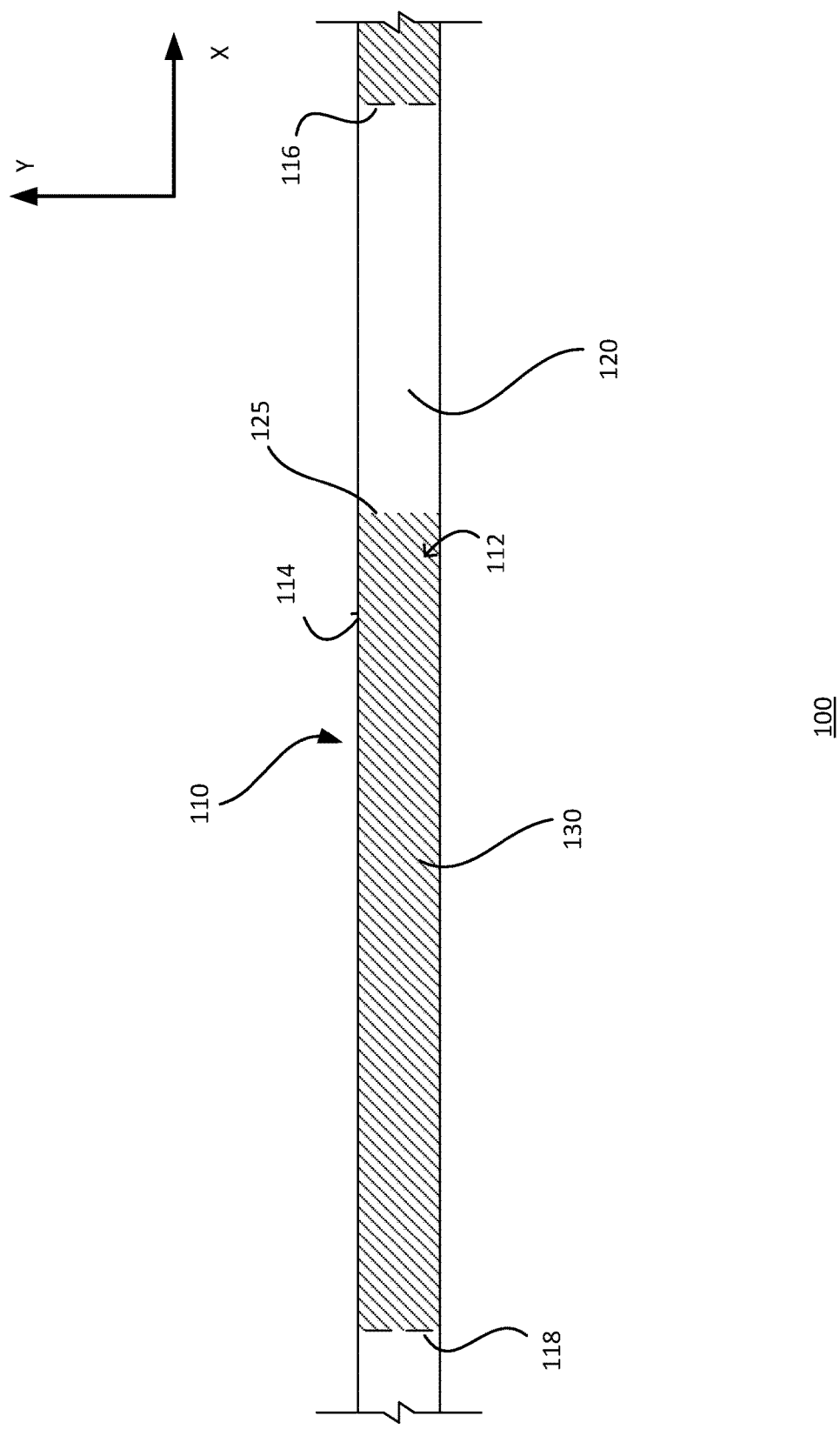
FIGS. 1A and 1B are schematic illustrations of a portion of a wrapping material according to an aspect of the disclosure.
Figure 1B:
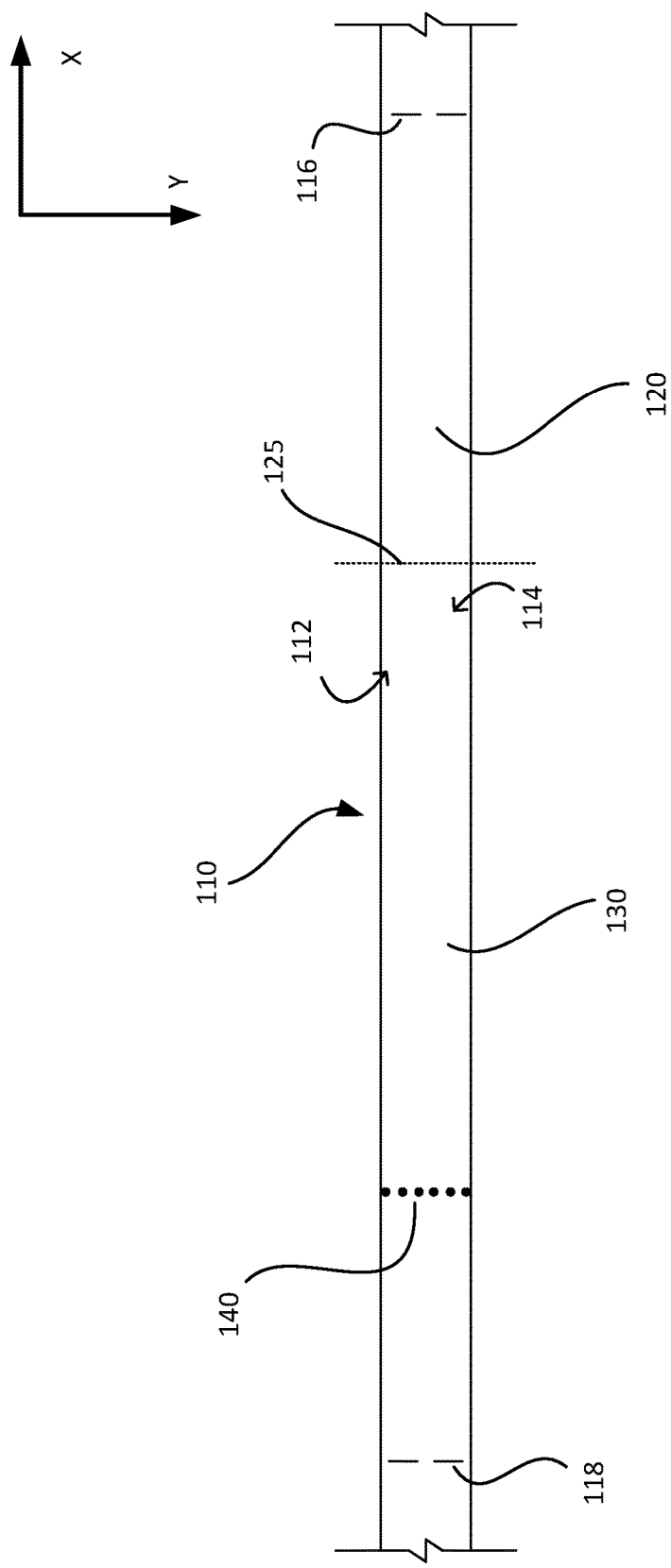

FIGS. 1A and 1B illustrate an example wrapping material 100 for wrapping around an agricultural product, such as cotton, in order to form a bale. In the examples of FIGS. 1A and 1B, an unrolled portion of the wrapping material 100 is shown. The unrolled portion extends in a longitudinal or X direction and has a uniform width in a lateral or Y direction. The wrapping material may be stored in a rolled configuration, such as on a roll, and may be unrolled at a time when the agricultural material is to be wrapped. In the example of FIGS. 1A and 1B, the wrapping material may be unrolled in the X direction (from left to right).

The wrapping material 100 may be formed as a continuous web of material. The continuous web of material may be made of polyolefins, such as polyethylene, or other suitable polymeric material that is approximately 40 to 120 microns thick. The continuous web may include a plurality of individual wrapping units 110, whereby each wrapping unit may be designed as a discrete unit for wrapping a respective bale. For example, a roll of wrapping material may include 24 individual wrapping units and may have a diameter of between about 20-30 centimeters.

The wrapping material may also have a first surface 112 and an opposing second surface 114 separated by the thickness of the material used. FIG. 1A shows the first surface 112, and FIG. 1B shows the second surface 114. As can be seen from FIGS. 1A and 1B, properties of the wrapping unit 110 may be different between the first and second surfaces. In the examples of the present disclosure, the first surface 112 may be designed to face towards the agricultural product, and the second surface may be designed to face away from the agricultural product, when wrapped to form a bale.

The wrapping units may be formed adjacent to one another longitudinally along the X direction, such that a leading end of one wrapping unit begins where the tail end of an adjacent wrapping unit ends. FIGS. 1A and 1B show an example wrapping unit 110, which is representative of the other wrapping units of the wrapping material 100. The wrapping unit 110 may include a leading end 116 that meets at a tail end of a previously unrolled wrapping unit (to the right of wrapping unit 110) and a tail end 118 that terminates at a leading end of a next wrapping unit to be unrolled (to the left of wrapping unit 110). Adjacent wrapping units may be fully connected to one another. Alternatively, adjacent wrapping units may be connected by a weak seam such as a perforation, to improve each of separating the wrapping units from one another. Alternatively, adjacent wrapping units may be connected by adhesives, by folding the leading and tail ends over one another, or any combination thereof. Some exemplary mechanisms for connecting the wrapping units are shown in commonly owned U.S. Pat. Nos. 6,787, 209 and 7,541,080, the disclosures of which are incorporated herein by reference.

The first surface 112 of the wrapping unit 110 may include each of a nontacky portion 120 extending lengthwise in the −X direction from the leading end 116 until border 125 which is at a predetermined distance from the leading end 116, and a tacky portion 130 extending lengthwise in the −X direction from the border 125 until the tail end 118. The tacky portion 130 may be designed to be sufficiently tacky so that the second surface 114 of the wrapping unit adheres to the tacky portion 130 of the first surface 112. For example, the tacky portion may have a tackiness property of more than 0.05 Newtons (N), using the standard peel test method ASTM D1876-01. Conversely, the nontacky portion 120 may be designed to be sufficiently nontacky so that the agricultural product does not adhere to the first surface 112 of the nontacky portion 120 of the first surface 112. For example, the tacky portion may have a tackiness property of less than or equal to about 0.05 N, using ASTM D1876-01.

In the example of FIGS. 1A and 1B, the entire first surface 112 of the tacky portion 130 is shown as being covered with tacky material. However, in other examples, the tacky portion of the first surface 112 may be intermittently tacky in any pattern desired, including but not limited to a vertical stripe pattern, a horizontal stripe pattern, a diagonal stripe pattern, a combination of patterns, and so on. In those examples of tacky portions having intermittent tackiness, the spaces between the tacky material may have a tackiness property the same or similar to that of the nontacky portion.

In the example of FIGS. 1A and 1B, the tacky portion 130 is tacky on the first surface 112 and nontacky on the second surface 114. However, in other examples, the tacky portion 130 may be tacky on both surfaces 112, 114. Also, in the example of FIGS. 1A and 1B, the nontacky portion 120 may be nontacky on both the first and second surfaces 112, 114. However, in other examples, the nontacky portion may be nontacky on the first surface 112 and tacky on the second surface 114. In any of these examples, the surfaces of the wrapping unit that are tacky may be entirely tacky or intermittently tacky as described herein.

Dimensions of the wrapping unit 110 and each of the nontacky portion 120 and tacky portion 130 may be selected so as to provide a secure wrap around the bale of agricultural product, while at the same time improving ease of removal of the wrapping material from the agricultural product, such as upon unloading the bale at a processing station. The example wrapping material of FIGS. 1A and 1B is designed for wrapping a bale having a width of approximately 2.5 meters and a circumference of about 6 meters. In this particular example, the width of the wrapping unit 110 in the Y direction is about 2.5 meters, approximately equal to that of the bale width. The length of the wrapping unit 110 in the X direction is about 21 meters, and more particularly more than triple that of the bale circumference. The length of the non-tacky portion 120 in the X direction is about 7 meters, and more particularly it is greater than the circumference of the bale. The length of the tacky portion 130 in the X direction is about 14 meters, and more particularly it is greater than twice the circumference of the bale.

Also shown in FIG. 1B is a visual indicator 140 positioned along a width of the wrapping unit 110 on the second surface 114 of the tacky portion 130. The visual indicator 140 is provided to identify a predetermined location along the circumference of the bale at which the wrapping unit should be cut when unwrapped. As described in greater detail herein, the predetermined location may be chosen to avoid creating loose or separated fragments of wrapping material as the wrapping material is being separated from the agricultural product.

Figure 2:
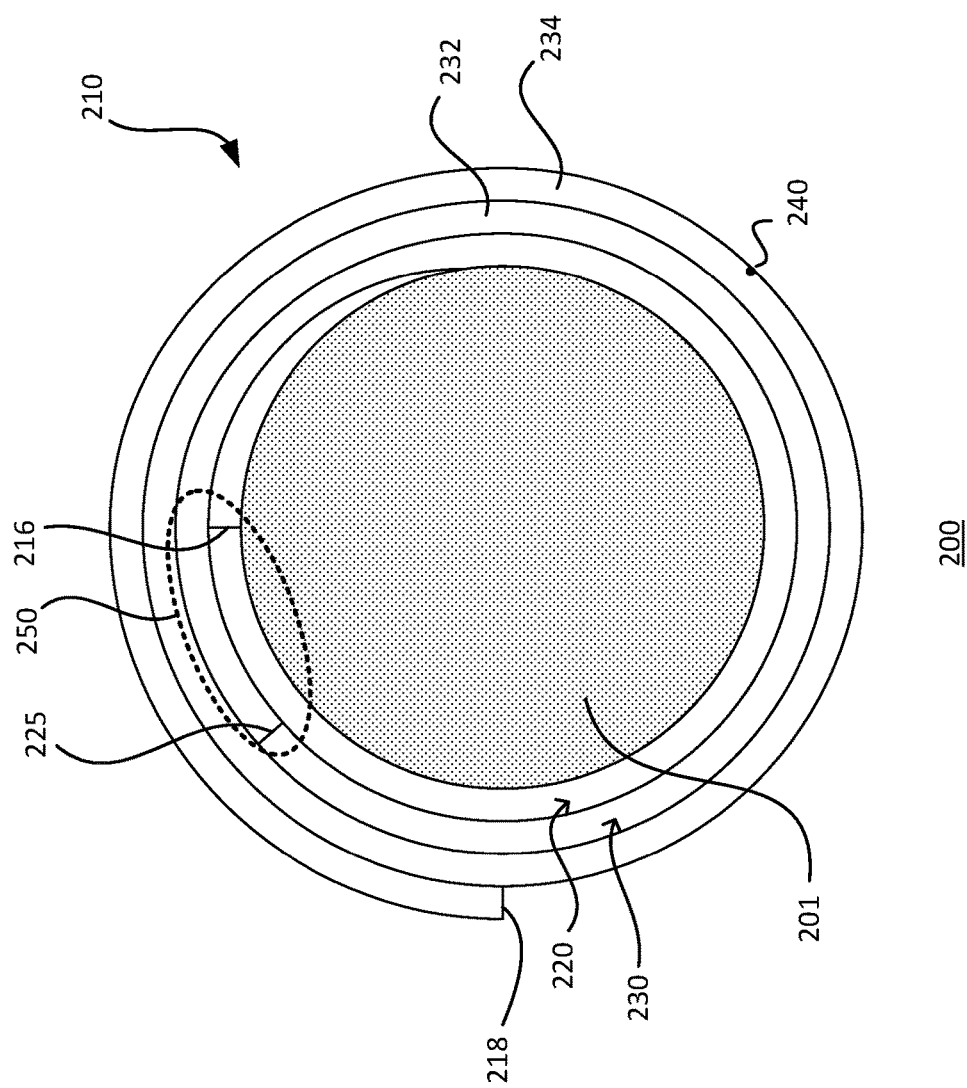
FIG. 2 is a schematic illustration of a wrapping material wrapped around a bale according to an aspect of the disclosure.

FIG. 2 illustrates an example wrapped bale 200 including a cylindrical bale of agricultural product 201 and a wrapping unit 210 wrapped around the bale. In the example of FIG. 2, the bale is round or cylindrical. A diameter of the bale is shown, and a width of the bale is in a direction pointing into or out of the figure. In other example arrangements, the bale may be another shape such as square, prism, or the like without departing from the underlying principles of the disclosure. In some examples, the bale may have a width of between about 2.5 to 3 meters, and a circumference of between about 6 to 7 meters. However, it should be understood that the underlying principles of this disclosure may be applicable to bales of any width and circumference. For example, comparable wrapping materials may be designed to wrap a bale may having a width of about 1.5 meters, a diameter of about 2.4 meters, and a circumference of about 5.7 meters. In such an example, the wrapping material may be slightly wider than the bale's width, such as about 1.8 meters, slightly longer than double or triple the bale's circumference, such as about 12 meters or 17.5 meters A leading end 216 of the wrapping unit 210 is shown in FIG. 2 as abutting a surface of the bale agricultural product 201. A tail end 218 of the wrapping unit 210 is shown as resting on an outer surface of the wrapped bale including the wrapping unit. The leading end 216 and tail end 218 may extend into or out of the figure so as to run along an entire or about an entire width of the bale.

In the example of FIG. 2, a nontacky portion 220 constitutes an inner portion of the wrapping unit 210, such that its first surface is in contact with the bale of agricultural product 201 when wrapped around the bale. Also, in the example of FIG. 2, the nontacky portion 220 has a length that is greater than 100% of the circumference of the bale, so as to overlap the leading end 216 of the wrapping unit 210. The overlap 250 between overlapping portions of the nontacky portion 220 may be provided to ensure that the entire circumference of the bale 201 is in contact with the nontacky portion 220, as opposed to a portion of the bale 201 being in contact with the tacky portion 230. This, in turn, may ensure that none of the agricultural product adheres to the wrapping unit 210, and particularly to the tacky portion 230 of the wrapping unit 210, which would impede with separation of the agricultural product from the wrapping unit during an unwrapping procedure. The length that the overlap 250 extends around the circumference of the bale may be a limited distance. In some examples, the length of the overlap may be limited to about 1 meter. which in the case of a bale having a 6 meter circumference, may be about 15% of the circumference of the bale, whereby the length of the nontacky portion 220 is about 115% of that of the circumference of the bale. In some examples, the length of overlap may be limited to approximately 0.4 meters or less, which in the case of a bale having a 6 meter circumference may be about 6-7% of the circumference of the bale, whereby the length of the nontacky portion 220 is about 106%-107% of that of the circumference of the bale. The presence of overlap 250 results in a portion of the nontacky portion 220 not being in contact with any part of the tacky portion 230. Specifically, in the example of FIG. 2, a length of nontacky portion 220 from the leading end 216 to a part of the nontacky portion 220 underlying a boundary 225 between the nontacky portion 220 and the tacky portion 230, is not in contact with the tacky portion 230. This length of the nontacky portion 220 forms an appendage which, if cut, could become separated from the rest of the wrapping unit. Limiting the length of the overlap 250 may avoid an excess length of wrapping material forming an unwieldy appendage which may become separated when the wrapping unit is ultimately unwrapped from the agricultural product. For instance, with reference to FIG. 2, if the wrap 210 is cut at a circumferential location between leading end 216 and border 225, a piece of the wrapping unit 210 would be detached from the rest of the wrapping unit 210 and could become a loose or separated piece of plastic. Minimizing this circumferential length of overlap 250, or at least decreasing the length of overlap 250, can decrease a risk of a loose or separated piece of plastic separating from the wrapping unit and getting mixed in with and contaminating the agricultural product during processing.

Also in the example of FIG. 2, a tacky portion 230 constitutes an outer portion of the wrapping unit 210, such that its first surface avoids contact with and adhering to the bale of agricultural product 201 when wrapped around the bale. Instead, the first surface of a first sub-portion 232 of the tacky portion 230 is in direct contact with and adhered to the second surface of the nontacky portion 220, the first surface of a second sub-portion 234 of the tacky portion 230 is in direct contact with and adhered to the second surface of the first sub-portion 232 of the tacky portion 230. Also, in the example of FIG. 2, the nontacky portion 220 has a length that is greater than 200% of the circumference of the bale, so as to twice overlap the boundary 225 between the nontacky portion 220 and the tacky portion 230 of the wrapping unit 210. The double overlap may be provided to ensure a sufficient thickness or rigidity of the wrapping unit around the circumference of the bale 201. Stated another way, the second sub-portion 234 of the tacky portion 230 may be thought of as a reinforcement for the first sub-portion 232 of the tacky portion 230. This may ensure that the agricultural product retains its structure during formation, transportation, unloading and unwrapping, which in turn may ensure clean separation of the wrapping unit from the bale. It should be understood that the reinforcement sub-portion 234 may be partially omitted without departing from the underlying principles of the present disclosure.

Also shown in the example arrangement of FIG. 2. is a visual indicator 240. The visual indicator may extend along a width of the wrapping unit 210 at a given distance from the tail end 218. The given distance from the tail end 218 may be predetermined to not lie at a same circumferential position as the overlap 250 of the nontacky portion 220, such that it does not overlay the overlap 250 when wrapped around the bale. Circumferentially separating the overlap 250 from the visual indicator 240 may minimize the risk of cutting within the overlap 250 and separating the aforementioned appendage from the remainder of the wrapping unit during unwrapping. Thus, the visual indicator can decrease the likelihood of a portion of the nontacky portion 220 that is not adhered to the first surface of the tacky portion 230 being physically separated from the rest of the wrapping unit 210 when the bale is unwrapped. As a result, it is easier for the wrapping unit to be separated from the bale of agricultural product in a single piece, leaving no pieces of plastic to get mixed in with and contaminate the agricultural product during processing.

Figure 3:
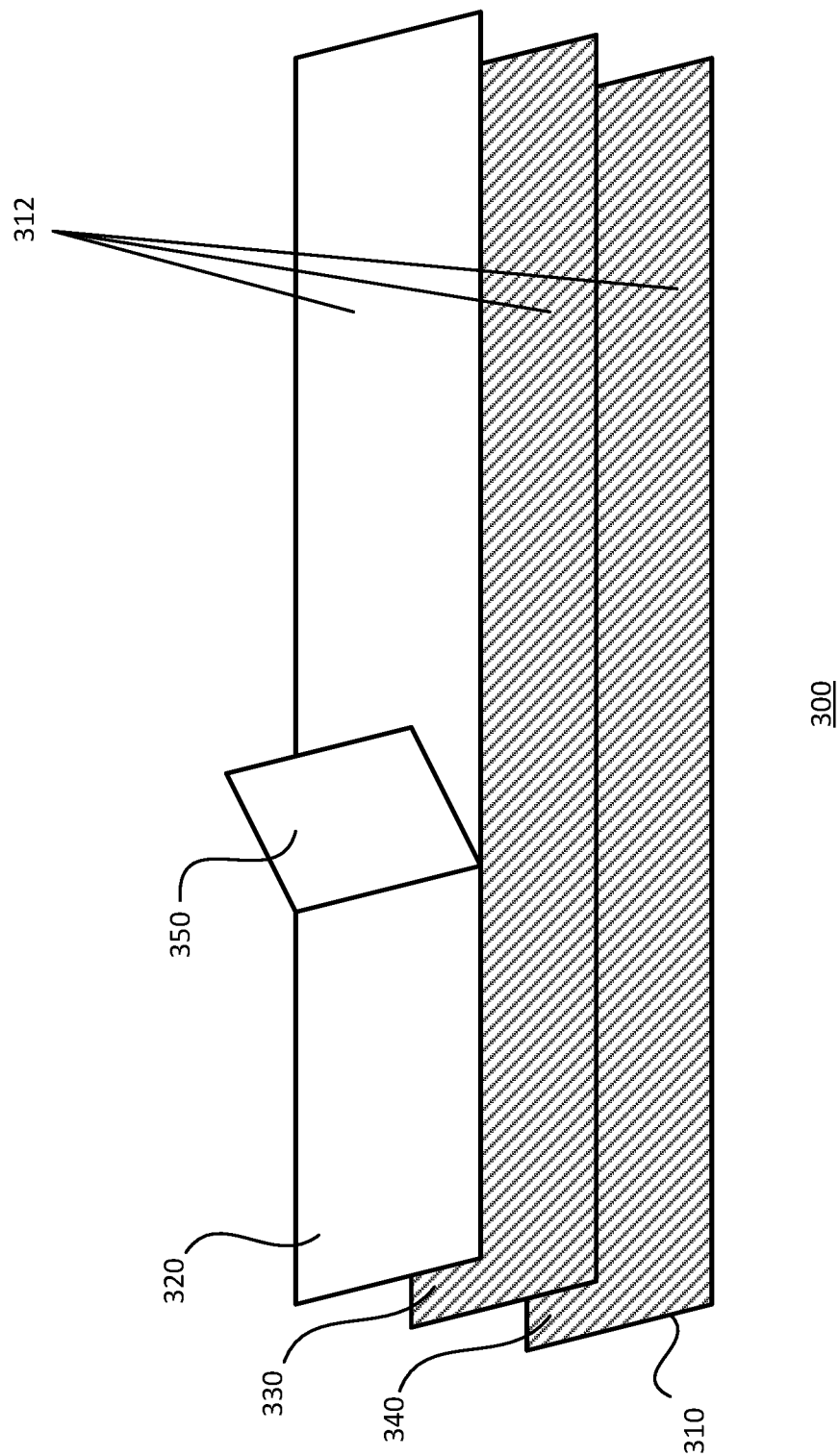
FIG. 3 is an exploded schematic illustration of a wrapping material after being unwrapped around a bale according to an aspect of the disclosure.

FIG. 3 is an exploded diagram illustrating an example wrapping unit 300 after it has been cut and separated from a bale of agricultural product. In the example of FIG. 3, the wrapping unit is cut along a cut line 310 that extends across a width of the wrapping unit. In some examples, the cut line may be defined by a visual indicator (not shown).

In FIG. 3, a first surface 312 of the wrapping unit is shown. The first surface is the surface that previously faced inward towards the bale of agricultural product when the wrapping unit was wrapped around the bale. Although the exploded diagram of FIG. 3 shows three portions 320, 330, 340 of the wrapping unit 300 as separate from one another, it should be understood that these portions actually remain adhered to one another during the unwrapping process, as the tacky first surface of the second portion 330 causes it to adhere to the second surface of the first portion 320, and the tacky first surface of the third portion 340 causes it to adhere to the second surface of the second portion 330.

It should be understood that each of the portions 320, 330 and 340 shown in FIG. 3 has a length equal to a circumference of the bale, as the cut line 310 for each portion is aligned circumferentially on the bale.

It can be seen in FIG. 3 that the nontacky portion of the wrapping material is longer than a circumference of the bale. In other words, the nontacky portion covers the entire first portion 320 of the wrapping unit, but an additional length of an appendage 350. The appendage is shown as free in FIG. 3 because it is not adhered to a first surface of the tacky second portion 330. By design, the wrapping unit 300 is designed such that the appendage 350 is located circumferentially away from the cut line 310, so that cutting the wrapping unit 300 at the cut line 310 does not cut through the appendage 350. Thus, while the appendage 350 is free on one end in the exploded diagram of FIG. 3, it remains connected at its other end, and thus remains a connected part of portion 320. Since, as noted above, portion 320 is connected to portion 330, which in turn is connected to portion 340, the appendage 350 remains attached to all of the portions 320, 330, 340 upon removal of wrapping unit 300 from the bale by cutting along cut line 310. It should be understood that the wrapping unit may also be cut at any other circumferential location except through appendage 350, and the appendage would remain connected to the entire wrapping unit 300 when the wrapping unit 300 is removed from the bale in a single piece.

It can also be seen from the example of FIG. 3 that the tacky portion of the wrapping material is exactly twice as long as the circumference of the bale. In other words, the tacky portion covers the entire second portion 330 and entire third portion 330 of the wrapping unit 300. In other examples, the tacky portion may be longer, extending to a fourth portion that may adhere to a second surface of part of the third portion. In other examples, the tacky portion may be shorter, such as having a third portion that adheres to the second surface of the second portion and extends only part of the length of the circumference of the bale.

Figure 4:
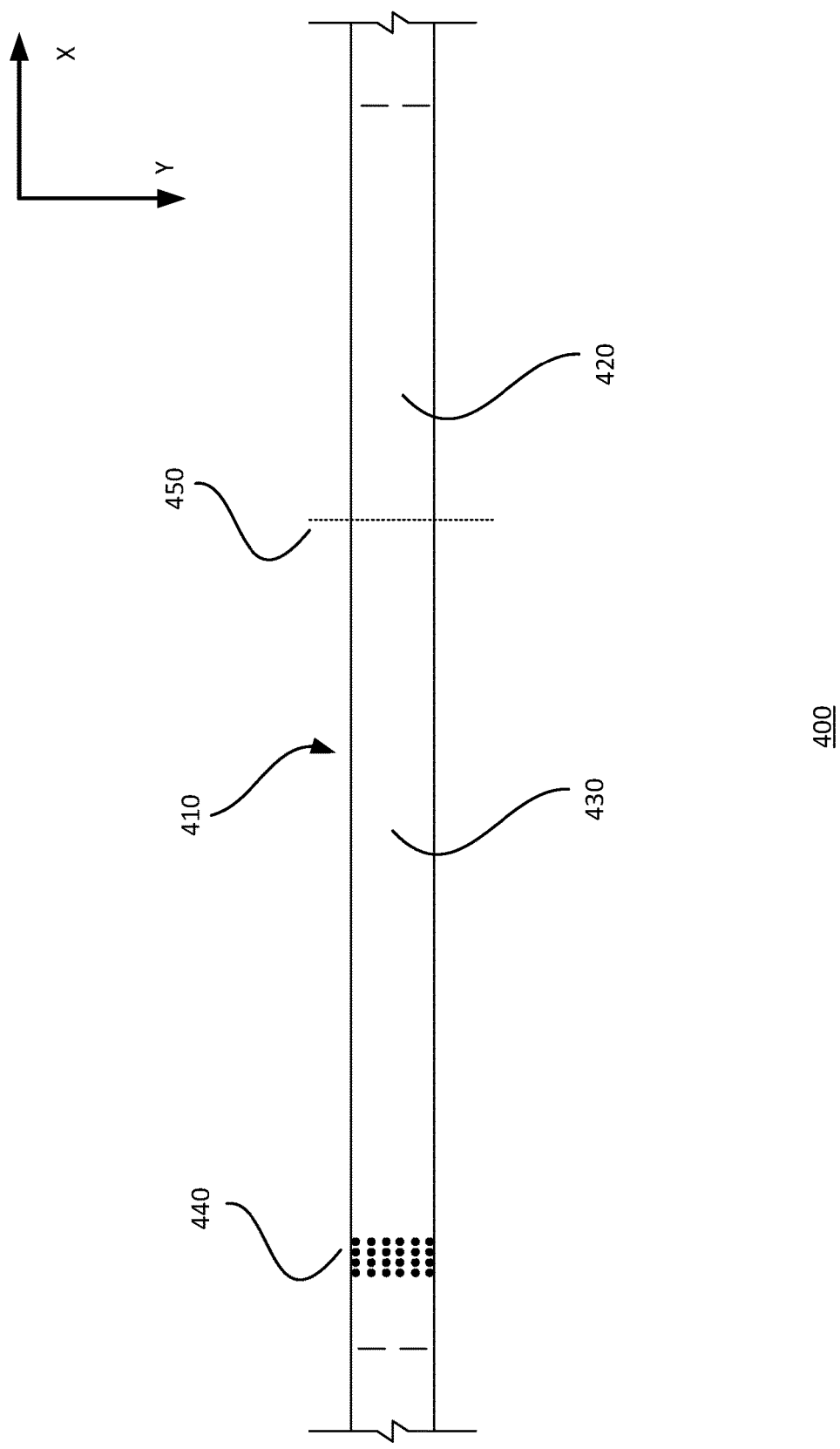
FIG. 4 is a schematic illustrations of a portion of another wrapping material according to an aspect of the disclosure.

In the above example wrapping materials, each wrapping units includes a visual indicator indicating a circumferential location at which the wrapped bale may be cut. The goal of this visual indicator is to avoid cutting over the free portion or appendage of the nontacky portion of the wrapping unit, since cutting through that appendage may form an appendage which can separate from the rest of the wrapping material and cause it to become mixed in with the agricultural product. However, in other examples, a visual indicator may directly indicate a location that the wrapped bale should not be cut, such that avoiding cutting the wrapping material at the circumferential location of the visual indicator in turn avoids cutting the loose portion of the nontacky portion. FIG. 4 illustrates a wrapping unit 410 of an example wrapping material 400 like in the example of FIGS. 1A and 1B, having each of a nontacky portion 420 and a tacky portion 430. A second surface of the wrapping material 400 is shown in FIG. 4. The tacky portion 430 includes a visual indicator 440 positioned at a location along the length of the wrapping unit that is expected to overlap with the tail of the nontacky portion 420, such as the appendage 350 shown in FIG. 3. For instance, if the wrapping material is designed to wrap a bale having a circumference of about 6 meters and the nontacky portion has a length of about 6.4 meters, then the visual indicator may be positioned at a distance of between about 18.4 to 18.8 meters from the leading end, which is about 12 to 12.4 meters from the boundary 450 between the nontacky portion 420 and tacky portion 430. This distancing ensures that when the wrapping unit is wrapped over the bale, the overlapping portions of the nontacky portion 420 and the visual indicator 440 all overlap one another, and thus, during removal of the wrapping unit, an operator sees the visual indicator and knows not to cut along that circumferential location.

In the example of FIG. 4, the visual indicator is shown as having a measurable width in the lengthwise direction -X of the wrapping material. However, in other examples, this visual indicator may be thinner and instead provide notice to an operator to avoid cutting anywhere in the vicinity of the visual indicator in order to avoid cutting over the overlapping portions of the nontacky portion.

Figure 5:
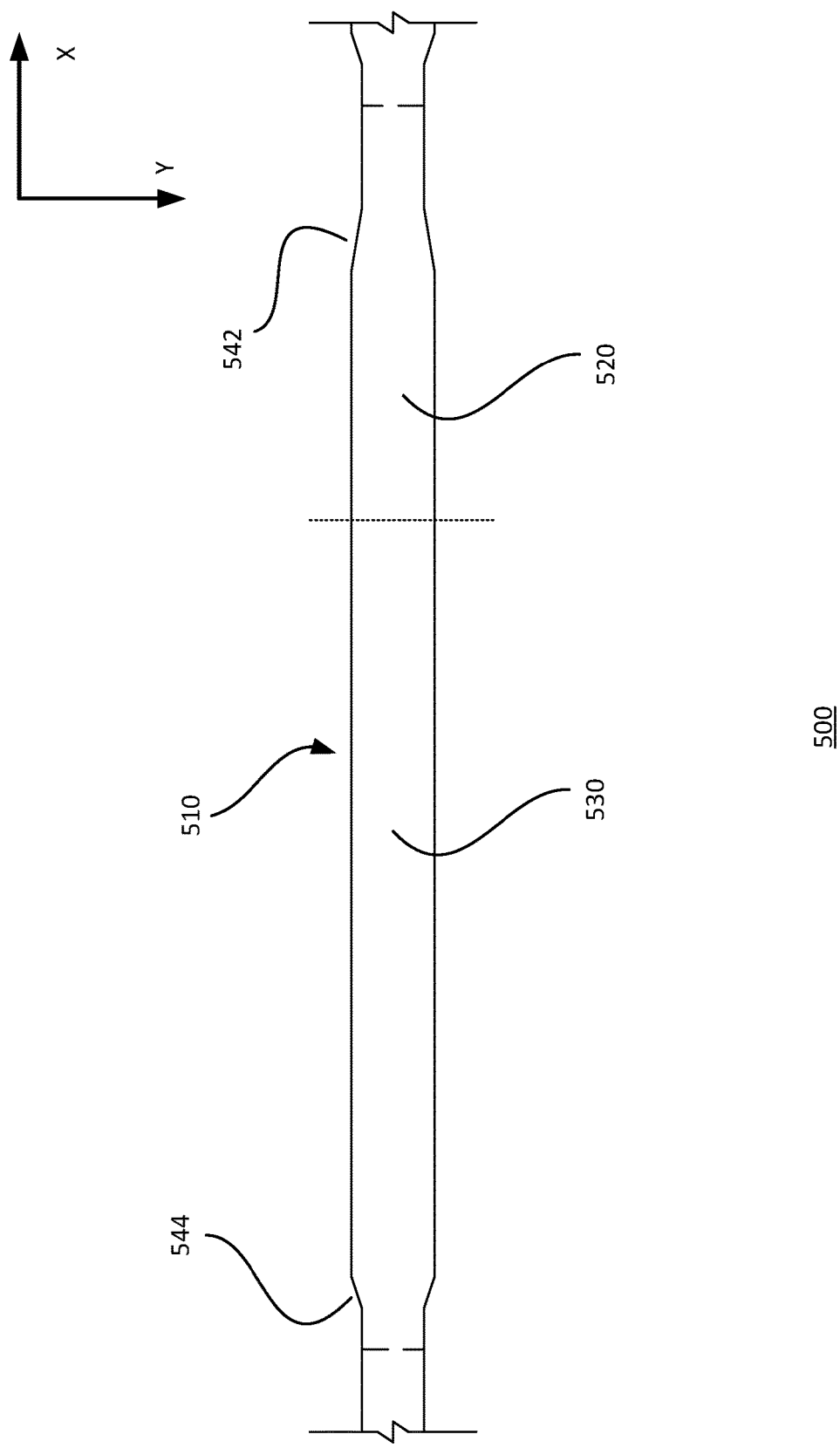
FIG. 5 is a schematic illustration of a portion of yet another wrapping material according to an aspect of the disclosure.

In the above example wrapping materials, the wrapping units are of uniform length. However, in some instances, either or both of the leading and tail ends of the wrapping unit may be designed to have narrower widths than the middle of the wrapping unit. This may be done at the edge of the leading end in order to improve feeding of the wrapping material into a baler machine, and at the edge of the tail end in order to avoid forming loose corners of the wrapping materials on an outer perimeter of the wrapped bale. FIG. 5 illustrates a wrapping unit 510 of an example wrapping material 500 like in the example of FIGS. 1A and 1B. A second surface of the wrapping material 500 is shown in FIG. 5. The nontacky portion 520 includes a first tapered portion 542 that widens from a first width to a second width in a lengthwise direction -X of the wrapping material. Similarly, the tacky portion 530 includes a second tapered portion 544 that narrows from the second width to the first width.

In the example of a wrapping material made for wrapping bales that are about 2.7 meters in width, the first width may be about 2.3 meters, and the second width may be about 2.7 meters. Thus, the first width may be between 85-90% of the second width. In other examples, different first and second widths may be provided, for instance depending on the width of the bale intended to be wrapped with the wrapping material and the amount of desired exposure at either edge of the wrapped bale of the second width relative to the first width.

Also, in the example of FIG. 5, the tapered portions 542, 544 are spaced apart from the edges of the leading and tail ends. However, in other examples, a tapered portion may be positioned directly at the edge of the leading end, the edge of the tail end, or both.

Figure 6:
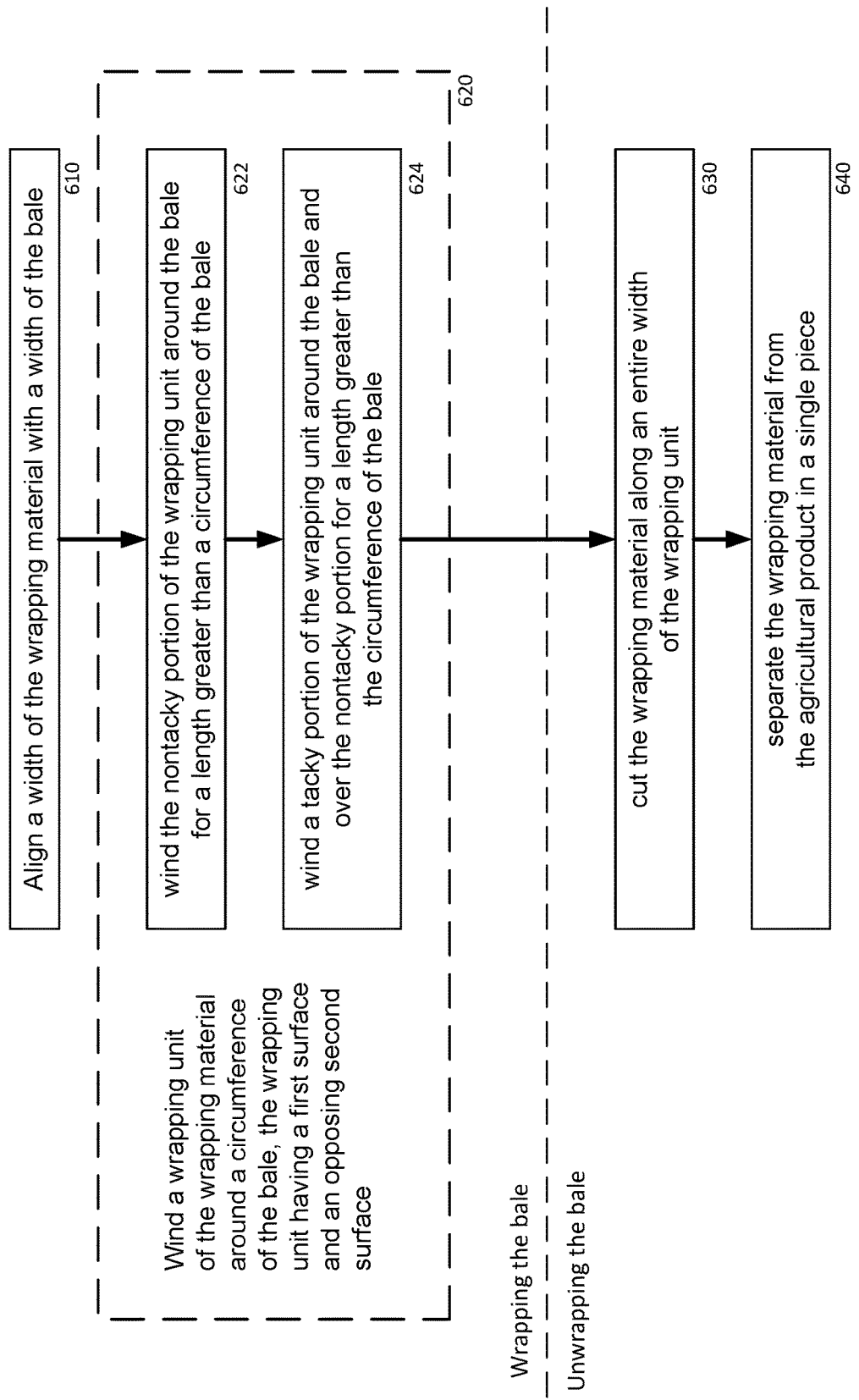
FIG. 6 is a flow diagram of a routine for wrapping and unwrapping a wrapping material around a bale according to an aspect of the disclosure.

FIG. 6 is a flow diagram illustrating an example routine 600 for using the example wrapping materials described herein. It should be understood that the routine 600 is provided merely by way of example, and that in other examples, certain steps may be added, omitted, or reordered without departing from the underlying principles of the present disclosure. For example, the routine 600 is divided into two separate phases: wrapping a bale; and unwrapping the bale. However, either one of these phase may be performed on its own. Additionally or alternatively, a routine of using the wrapping material may involve such steps as harvesting an agricultural product and organizing it into a mass for baling inside a baler, loading the wrapping material into a baler, operating the baler, storing a wrapped bale, transporting a wrapped bale, unloading a wrapped bale, processing the agricultural product from an unwrapped bale, and so on.

At block 610, the width of the wrapping material is aligned with a width of the bale. The alignment may be performed manually, or automatically such as with a baling device. Generally, the wrapping material may be formed on a roll, and the width of the roll of wrapping material may be about equal to the width of the bale.

At block 620, a wrapping unit of the wrapping material is wound around a circumference of the bale. The wrapping unit has each of a first surface facing towards the bale, and an opposing second surface facing away from the bale. For example, portions of the first surface may be nontacky and portions of the first surface may be tacky, as described herein.

Winding the wrapping unit around the bale may involve, at block 622, winding a nontacky portion of the wrapping unit around the bale, and at block 624, winding a tacky portion of the wrapping unit around the bale and over the nontacky portion. The nontacky portion may be wrapped for a length greater than a circumference of the bale, and the tacky portion may be wound for a length greater than the circumference of the bale. In some examples, the nontacky portion of the wrapping unit may be wound for a length that is more than 100% but less than 115% of the circumference of the bale, or more than 100% but less than 106% or 107% of the circumference of the bale. Also in some examples, the tacky portion of the wrapping unit may be wound for a length that is about twice the circumference of the bale, or in some instances longer than twice the circumference of the bale, or in other instances less than twice the circumference of the bale or even only about one circumference of the bale. Increasing the length of the tacky portion may improve stability of the wrapped bale, while decreasing the length of the tacky portion provides for less use of wrapping materials. After block 624, the wrapping unit may be separated from the rest of the roll of wrapping material, thus leaving a single wrapped bale of agricultural product.

In some examples, winding the wrapping unit around the bale may further involve securing the tail end of the wrapping unit to the rest of the wrapping material. Securing the tail end of the wrapping unit may be necessary to avoid the tail end peeling away from the bale during storage or transport. In some instances, a tackiness property of the tail end may be the same as the remainder of the tacky portion, and may be sufficient for securing the tail end so that it does not peel away from the bale. In other examples, the first surface of the tail end may have an adhesive material applied thereto. The adhesive material may have a greater adhesion property than the tacky material, and thus may improve reinforcement of the tail end and protect against the tail end peeling away from the bale during storage or transport. Example adhesive materials are described in commonly owned U.S. Pat. No. 7,541,080, the disclosure of which are incorporated herein by reference.

At block 630, the wrapping material may be cut along an entire width of the wrapping unit. The cut may be lined up based on the position of a visual indicator made on an outer surface of the bale, particularly on a second surface of the tacky portion of the wrapping unit. In some examples the visual indicator may be positioned circumferentially away from overlapping portions of the nontacky material, such that cutting along an entire width of the wrapping unit may involve cutting along the visual indicator to avoid cutting the overlapping portions of the nontacky portion. Alternatively, the visual indicator may be a "DO NOT CUT" indicator that overlaps with the overlapping portions of the nontacky material, and cutting along an entire width of the wrapping unit may involve avoiding cutting along the visual indicator in order to avoid cutting the overlapping portions of the nontacky portion.

At block 640, the wrapping material may be separated from the agricultural product. The outer layers of tacky wrapping material may adhere or cling to the inner layer of non-tacky material. Additionally, the inner layer of nontacky material may avoid adhering to the agricultural product. Thus, the wrapping unit may be separated from the agricultural product in a single piece, leaving the entire bale agricultural product for processing.

The above example wrapping materials, and example wrapping and unwrapping methods may be useful for safely and cleanly unloading bales of cotton at a processing facility, such as a ginning facility. Generally, a ginning facility will include an unloading dock onto which the cotton bale may be unloaded from a vehicle. Unloading the bale from the vehicle may involve lowering the bale from the vehicle while also tipping the bale from a resting position on its side in the vehicle to an upright position on the dock, and subsequently unwrapping the wrapping material from the bale. In some examples, the dock may be a stationary platform. In other examples, the dock may be a conveyor belt, which may or may not be moving at the time of unloading.

In order to unload the cotton bale safely without damaging the bale, it is necessary for the wrapping material to be sturdy enough to support the bale as it is lowered from the vehicle and tilted upright. Additionally, in order to unwrap the bale cleanly without fragments of the wrapping material mixing in with the cotton, it is necessary for the wrapping material to pull away from the bale in as few pieces as possible. The above example wrapping materials and wrapping and unwrapping methods provide for a wrapping material that gives sufficient support for unloading the bale while also allowing for the wrapping material to be separated from the bale in a single piece. As a result, a risk of failure during the bale unwrapping process is lowered, which leads to less wrapping material becoming mixed in with the cotton. Thus, the cotton processed at the ginning station may have lower overall amounts of contamination.

Cotton bales wrapped with a wrapping unit in accordance with the above-described design were tested against cotton bales wrapped with two alternative wrapping materials, TamaWrap+™ and TamaWrap™ blue to confirm that the design of the present disclosure mitigates the risk of failure during the bale unwrapping process. The tests were conducted to determine a failure rate for unloading and unwrapping the cotton bales, whereby failure was measured by pieces of the wrapping material being found in the ginning equipment. The ginning equipment was inspected using a camera set up at the beginning of the feeding process, and an apparatus was set up for automated residue removal at the ginning stand. Testing was conducted for each bale under similar location, season and weather conditions.

Results of the test are shown in the Table below. The results exclude test bales that arrived at the unloading dock with one or more tears in the wrapping material, and test bales that arrived with a smaller-than-usual diameter, such as a diameter less than 2 meters, and tipped over during unloading as a result of its dimensions.

| Wrap Type | Unload Failure Rate | Unwrap Failure Rate | Overall Failure Rate |
| --- | --- | --- | --- |
| Current design | 0.51% | 0.26% | 0.97% |
| TamaWrap+ ™ | 0.81% | 0.40% | 1.23% |
| TamaWrap ™ blue | 0.98% | 0.87% | 1.84% |

As can be seen from the Table, the wrapping material of the present disclosure performed better than the known alternatives. The failure rate for unloading the cotton that was baled in the wrapping material of the present disclosure was about 59% lower than for the TamaWrap+™ wrapping material, and about 92% lower than for the TamaWrap™ blue wrapping material. The failure rate for unwrapping cotton that was baled in the wrapping material of the present disclosure was about 54% lower than for the TamaWrap+™ wrapping material, and about 235% lower than for the TamaWrap™ blue wrapping material. The overall failure rate for processing the cotton that was baled in the wrapping material of the present disclosure was about 27% lower than for the TamaWrap+™ wrapping material, and about 90% lower for the TamaWrap™ blue wrapping material, which means that 27% and 90% fewer bales, respectively, were found to be contaminated. These figures suggest significant mitigation of the risk of failure during the unwrapping process, which in turn reduces the overall level of contamination in the unwrapped cotton after being processed at the ginning facilities.

The reduction in failure rate caused by use of the wrapping material of the present application can lead to fewer batches of contaminated cotton being processed, on average. This in turn can preserve the overall value of the processed cotton, since fewer batches are contaminated and thus fewer batches suffer a reduction in value. Furthermore, producing fewer batches of contaminated cotton can improve or preserve the grower's or supplier's reputation, enabling the grower or supplier to sell even non-contaminated cotton for higher values.

The above example test results generally describe that the wrapping materials and wrapping/unwrapping methods of the present disclosure are advantageous for baling cotton. However, it will be readily appreciated that same or similar principles may be applied to wrapping materials and wrapping/unwrapping methods for other agricultural products, including but not limited to hay, flax straw, or silage.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A wrapping material comprising:
a continuous web of material including a plurality of wrapping units, each wrapping unit having a first surface and an opposing second surface, and extending lengthwise from a leading end to a tail end, the tail end of each wrapping unit terminating at the leading end of an adjacent wrapping unit, each wrapping unit configured to be circumferentially wrapped around a respective item from the leading end to the tail end to form a wrapper around the respective item, the wrapper defining a circumference around the item, the wrapping unit comprising:
a first longitudinal section extending lengthwise from the leading end of the wrapping unit for a first length, wherein a surface of the first longitudinal section is nontacky and wherein the first length is greater than the circumference, and
a second longitudinal section extending lengthwise from the first longitudinal section to the tail end of the wrapping unit for a second length, wherein a surface of the second longitudinal section is tacky and wherein the second length is greater than the circumference.

2. The wrapping material of claim 1, wherein the first surface of the second longitudinal section is tacky, and wherein both the first and second surfaces of the first longitudinal section and the second surface of the second longitudinal section are nontacky.

3. The wrapping material of claim 1, wherein the second longitudinal section has a tackiness of more than about 0.05 N, and wherein the first longitudinal section has a tackiness of less than or equal to about 0.05 N.

4. The wrapping material of claim 1, wherein the first length is more than 100% of the circumference, such that the first longitudinal section overlaps the leading end of the wrapping unit when formed as the wrapper.

5. The wrapping material of claim 4, wherein the first length is less than 115% of the circumference.

6. The wrapping material of claim 4, wherein the first length is approximately 0.4 meters greater than the circumference.

7. The wrapping material of claim 4, wherein the second length is about 200% of the circumference.

8. The wrapping material of claim 4, wherein the second length is more than 200% of the circumference, such that the second longitudinal section overlaps itself along the entire circumference when formed as the wrapper.

9. The wrapping material of claim 8, wherein the first length is approximately 7 meters, and wherein the second length is approximately 14 meters.

10. The wrapping material of claim 8, wherein the first surface of the first longitudinal section is nontacky and is configured to avoid adhering to an agricultural product, and wherein the first surface of the second longitudinal section is tacky and configured to adhere to the second surface of the wrapping unit.

11. The wrapping material of claim 10, wherein the first longitudinal section has sufficient tackiness to maintain adhesion between the first surface of the first longitudinal section and the second surface of the wrapping unit when the wrapping unit is formed as the wrapper and then cut in a widthwise direction, such that the wrapping unit separates from the respective item in a single piece.

12. The wrapping material of claim 11, wherein the first longitudinal section has sufficient nontackiness to avoid adhesion between the first surface of the first longitudinal section and the agricultural product.

13. The wrapping material of claim 10, wherein the second surface of the wrapping unit is nontacky at both the first and second longitudinal sections.

14. The wrapping material of claim 10, wherein the wrapping unit is configured such that, when formed as the wrapper, respective portions of the first longitudinal section overlap one another, and
wherein the wrapping material further comprises an indicator positioned at a predetermined location on the second surface of the second longitudinal section, wherein the wrapping unit is configured such that, when formed as the wrapper, the predetermined location does not overlap the respective portions of the first longitudinal section that overlap one another.

15. The wrapping material of claim 10, wherein the wrapping unit is configured such that, when formed as the wrapper, respective portions of the first longitudinal section overlap one another, and
wherein the wrapping material further comprises an indicator positioned at a predetermined location on the second surface of the second longitudinal section, wherein the wrapping unit is configured such that, when formed as the wrapper, the predetermined location overlaps the respective portions of the first longitudinal section that overlap one another.

16. The wrapping material of claim 1, wherein at least a portion of the first longitudinal section increases from a first width to a second width along a lengthwise direction of the wrapping unit, and wherein at least a portion of the second longitudinal section decreases from the second width to the first width along the lengthwise direction of the wrapping unit.

17. The wrapping material of claim 4, wherein the first length is approximately 1 meter greater than the circumference.

18. The wrapping material of claim 17, wherein the circumference is approximately 7 meters.

19. A wrapped bale of agricultural product comprising agricultural product and the wrapping unit of the wrapping material of claim 1.

20. The wrapped bale of claim 19, wherein a circumference of the bale is between 6-7 meters.

21. The wrapped bale of claim 19, wherein the agricultural product is cotton.

* * * * *